UNITED STATES PATENT OFFICE.

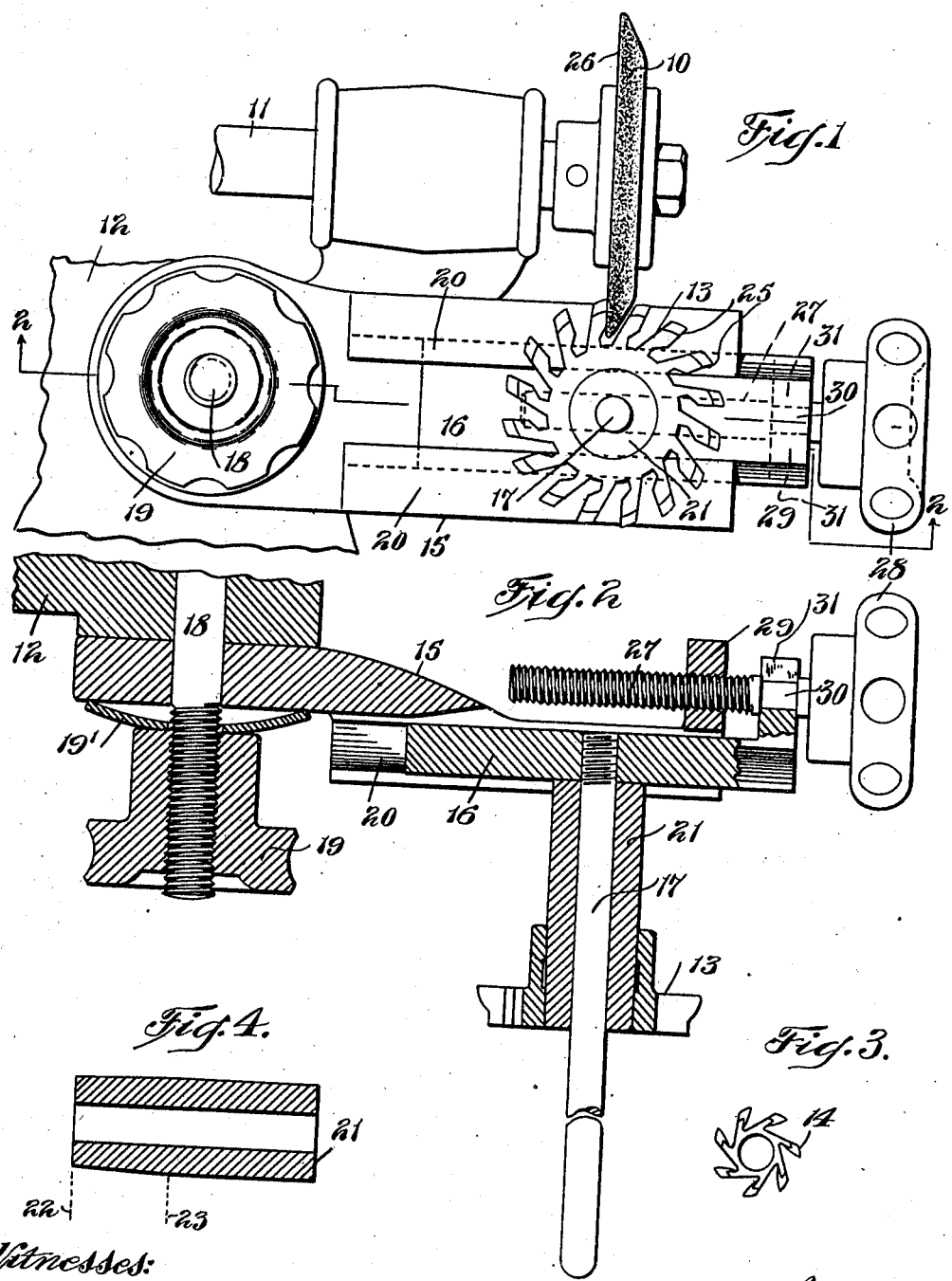

LESLIE N. DAVIS, OF CLIFTONDALE, MASSACHUSETTS.

GRINDING-MACHINE.

970,691.   Specification of Letters Patent.   Patented Sept. 20, 1910.

Application filed June 8, 1910.   Serial No. 565,812.

*To all whom it may concern:*

Be it known that I, LESLIE N. DAVIS, of Cliftondale, in the county of Essex and State of Massachusetts, have invented certain new and useful Improvements in Grinding-Machines, of which the following is a specification.

This invention relates to grinding machines, and especially to that type which is employed for grinding or sharpening rotary cutters such as those employed for trimming the edges of shoe soles.

A sole edge trimming machine is usually equipped with two separate rotary cutters or trimmers, one of said cutters being adapted for trimming the sole around the forepart and the other being adapted for otherwise trimming the sole along the shank. A cutter of relatively large diameter may be used for trimming around the forepart, because the upper does not overhang the forepart and therefore does not interfere with the cutter; but the shank portion of the sole is so much less in width than the upper at that point that the upper overhangs the sole to a considerable extent. For this reason it is necessary to restrict the diameter of the cutter which is used for trimming the shank. The central hole of the shank cutter is therefore restricted by the diameter of the cutter itself, but the central hole of the forepart cutter may be, and usually is, much greater diameter than the central hole of the shank cutter. It is apparent, therefore, that a cutter having a relatively large central hole and a cutter having a relatively small central hole require different supports for the purpose of holding them in operative relation to a grinding wheel when they are undergoing the sharpening process.

The present invention provides a holder or support adapted to be attached to a grinding machine and adapted to receive cutters having central holes of different diameters for the purpose of presenting said cutters to a grinding wheel. The support for the cutters is movable toward and from the grinding wheel and is adapted to be so moved by the hand of the operator. The support is furthermore adjustable in a manner adapted to adjust the angle of the face which is to be ground.

Of the accompanying drawings which illustrate one form in which the invention may be embodied: Figure 1 represents an elevation of a small portion of a grinding machine to which the device hereinafter described is attached. Fig. 2 represents a section on line 2—2 of Fig. 1. Fig. 3 represents an end elevation of a relatively small cutter adapted for trimming the shank of a sole. Fig. 4 represents a longitudinal section of a sleeve for receiving a cutter having a larger central hole.

The same reference characters indicate the same parts wherever they occur.

A grinding wheel such as an emery wheel is indicated at 10, said wheel being secured in any appropriate manner upon a rotating shaft 11. The wheel and shaft may be mounted in a frame of any appropriate form, a small portion of said frame being indicated at 12.

A cutter adapted for trimming around the forepart of a sole is indicated at 13 in Figs. 1 and 2, and a cutter adapted for trimming along the shank of a sole is indicated at 14 in Fig. 3. The central hole of the shank cutter is much smaller than the central hole of the forepart cutter, for the reason that the smaller diameter of the shank cutter restricts the size of the hole.

The device for supporting the cutters so as to present them to the emery wheel includes a swinging arm 15, a slide 16 and a spindle 17. The swinging arm is mounted upon a pivot stud 18 extending from a portion of the frame 12, the end of said stud being screw-threaded and provided with a hand nut 19 by which the swinging arm may be clamped with the desired tension. The swinging arm is provided with guides 20 in which the slide 16 is fitted with a dovetail or other undercut connection. The spindle 17 is securely fixed to the slide 16. It is preferably of a diameter slightly less than the diameter of the central hole of the shank cutter 14.

A sleeve for receiving the forepart cutter 13 is indicated at 21. The internal diameter of the sleeve is the same as the diameter of the central hole of the shank cutter 14. The sleeve is therefore adapted to be slipped upon the spindle 17 and to be moved freely either by rotation or longitudinal movement. One end of the sleeve is slightly tapered, as shown by Fig. 4, between the points 22 and 23. This tapered portion is adapted to enter the central hole of the forepart cutter 13 and to fit tightly in said cutter. It is apparent that the cutter 13 may be mounted upon the spindle 17 so as to be movable longitudinally of the spindle and to rotate upon the spindle by inserting the tapered end of the sleeve into the cutter and by placing the cutter and sleeve upon the spindle.

For the purpose of mounting the cutter 13 and the sleeve upon the spindle 17, the holder 15 may be swung away from the emery wheel. After the cutter has been placed in the desired position the holder 15 may be swung toward the emery wheel to the position shown by Fig. 1. The process of sharpening a cutter of this type consists in presenting the slightly tangent faces 25 to the transverse flat face 26 of the emery wheel.

Accurate grinding of the cutter requires a certain angular relation of the face 25 with reference to the center of the cutter. In order to determine and fix this relation the slide 16 is provided with adjustable means for securing it in any desired position with relation to the swinging arm 15. The adjustable means illustrated consists of a screw 27 provided with a knob or hand wheel 28. The back of the arm 15 is formed with an ear 29 which is internally screw-threaded for the reception of the screw 27. The screw 27 is provided with a cylindric shank 30 which is embraced by fingers 31 projecting from the slide 16. Longitudinal movement of the screw is thus transmitted to the slide by means of the fingers 31, the fingers being confined between shoulders on the shank 30.

By means of the screw 27 the slide may be adjusted so that the center of the spindle 17 may be brought to the desired distance from the plane of the grinding face 26. While the cutter 13 is thus supported in position for grinding, the cutter and sleeve, which are tightly connected, may be manually moved back and forth along the spindle in order to distribute the wear over the grinding face 26. The faces 25 of the cutter are held against the grinding face by a slight manual tension tending to rotate the cutter. When one face 25 has been sufficiently ground the cutter and sleeve may be moved longitudinally along the spindle out of the range of the emery wheel, and the cutter may then be rotated manually in order to bring the next face 25 into alinement with the grinding face. The cutter and sleeve may then be moved along the spindle to repeat the grinding operation. In this way the faces 25 may be ground successively without disturbing the tangent relation of the grinding face with reference to the center of the spindle 17, and the faces 25 may be ground upon a uniform tangent angle. As a result of preserving this tangent relation throughout the grinding of all of the faces 25, the time required for sharpening a cutter is greatly reduced by comparison to the present method. Another important advantage of preserving the tangent relation is that the metal of the cutter is not unduly wasted by first grinding the faces 25 to undesirable angles and then correcting their angles. The shank cutter 14 may be presented to the emery wheel in precisely the same manner, with the exception that it may be placed directly upon the spindle 17 without using any interposed sleeve.

I believe that it is new to equip a grinding machine of this type with means for supporting cutters having central holes of different diameter so that they may be ground in the same relative positions by one and the same grinding wheel. I think it is also new to provide a support for a cutter which is adjustable for the purpose of determining and fixing the angle by which the faces of the cutter are made tangent.

Having thus explained the nature of my said invention and described a way of constructing and using the same, although without attempting to set forth all of the forms in which it may be made or all of the modes of its use, what I claim is:

1. A work holder for cutter-grinding machines comprising a supporting member, a slide adjustably mounted in said supporting member, a spindle carried by said slide, and a sleeve adapted to rotate on said spindle and provided with a tapered end constructed to enter an opening in the cutter to be ground, whereby relative rotation of the cutter and sleeve is prevented.

2. A work holder for cutter-grinding machines comprising a supporting member pivotally mounted at one end and provided with an offset portion at the other end, a slide mounted in and carried by said offset portion, means for adjusting said slide in said offset portion, and a spindle carried by said slide.

In testimony whereof I have affixed my signature, in presence of two witnesses.

LESLIE N. DAVIS.

Witnesses:
MARY G. DAVIS,
CHAS. G. WOODBRIDGE.